Figure 1:
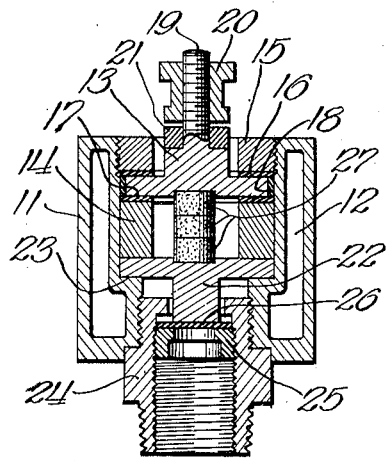

July 8, 1941.                A. W. KRAUSE                    2,248,301
                       DEVICE FOR MEASURING PRESSURE
                           Filed Oct. 9, 1936

Patented July 8, 1941

2,248,301

UNITED STATES PATENT OFFICE 2,248,301

DEVICE FOR MEASURING PRESSURE

Albert W. Krause, Evanston, Ill.

Application October 9, 1936, Serial No. 104,907

2 Claims. (Cl. 201—51)

This invention relates, broadly stated, to electrical pressure measurements, and is more particularly concerned with a novel and improved method and a new device for measuring fluid or mechanical pressures covering a wide range from gradual pressure phenomena to sudden impact pressures. The designation "fluid pressures" used herein is intended to comprise pressures occurring due to or within fluid media, including gases and liquids.

Specifically stated, the present invention relates to improvements in methods and devices of the type wherein sensitive resistance elements, for example, carbon disks or the like, are subjected to the pressure or pressures to be measured or investigated, thereby controlling electrical circuits and operating suitable control or indicating means as a function of the pressure to which the resistance elements are subjected. The primary object of my invention is concerned with the provision of a system and of elements of this type which are more sensitive and more accurate in operation, and with improvements whereby the utility and applicability of such devices is enhanced and considerably increased.

Devices and methods of this general class, employing elements which vary their ohmic resistance in response to applied pressure, are known. However, they are of a more or less complicated character and are usually designed so that they can be used only in specific cases. The principal objections that may be raised against these known devices are concerned with their sluggish response, particularly in the case of gradually changing pressures or in the case of pressures of great magnitude. The zero point drifts or is variable, which is especially true with devices for measuring or recording or otherwise investigating rapidly changing pressures or pressure impacts occurring in rapid sequence, and hysteresis errors occur as a consequence of sluggish or retarded recovery of the resistance elements. Accurate measurements are therefore largely impossible, and small variations of pressure cannot be successfully and accurately recorded with devices of this class as constructed in the past.

My invention overcomes the drawbacks intimated above and furnishes a device that may be advantageously used for investigating pressures in many fields, including natural pressure phenomena, for example, water pressures or pressures in geologic formations, or artificial pressures, such as occur in artillery guns, internal combustion engines, power plants, or in a great variety of machine parts and tools as they are used in modern industry. My new device is of a unitary character, of a simple and sturdy structure, and is reliable and accurate in operation.

Described briefly, the apparatus of my invention comprises a simple device which is directly subjected to the pressure to be measured or investigated, and electrical circuits connected to the device and including recording or indicating means responsive to the behavior of purely ohmic resistance elements contained in the device and arranged therein in such a novel manner that their response to pressure will be extremely sensitive and substantially constant. Accordingly, the zero point will remain substantially constant, and errors due to hysteresis can be neglected for practical purposes.

The pressure-responsive device, per se, comprises a completely closed housing enclosing a carbon resistance element with means for adjusting a predetermined resistance thereof; and the electrical arrangement comprises circuit means, including a loop circuit, containing the resistance element or elements of the pressure device, and a loop circuit, including a balancing or compensating resistance, which may be preadjusted to the normal value of the resistance element. One side of each loop circuit is common to both and includes the recording or indicating instruments. The differential current in the common circuit of the two loops is zero when the external pressure applied to the pressure element is zero. The applied external pressure determines the differential current in the common circuit, and thus causes the actuation of the indicating or recording instruments. This differential circuit arrangement is not unlike a bridge circuit having in one leg the resistance element to be subjected to the pressure which is to be investigated, and in the other leg or arm a balancing or compensating resistance to be preadjusted to the normal or zero value of the pressure element.

The indicating or recording means may be connected to the common arm of the circuit arrangement, preferably by suitable switching means, so as to enable the operator to observe the response of the apparatus in any manner best suited or desired for a particular case of investigation. The power source may be in the form of an ordinary low-voltage battery connected in the two loop circuits. The entire apparatus may be stationary or portable, according to the type of investigations for which it is to be used. The operation is not subjected to and is not affected by external electrical conditions.

Some of the salient objects and features of the invention may be concisely stated as follows:

One object of my invention is concerned with a pressure-measuring device comprising an electrical circuit containing indicating apparatus, a loop circuit including a power source and a resistance means connected to one side of said circuit, and a loop circuit including a power source and a resistance element connected to the other side of said circuit, wherein said resistance means normally balances said resistance element to produce zero indication of said indicating apparatus, together with means for subjecting said resistance element to pressure to change its resistance, whereby indication of said apparatus is caused in terms of the applied pressure.

Another object relates to a measuring system and device, as defined in the preceding paragraph, wherein a variable resistance constitutes said resistance means and a carbon resistance device constitutes said resistance element.

A further object has to do with the provision of means for completely enclosing said carbon resistance element, if desired in a water-tight manner, together with means for selectively pre-determining the normal pressure to be applied thereto.

Figure 2:
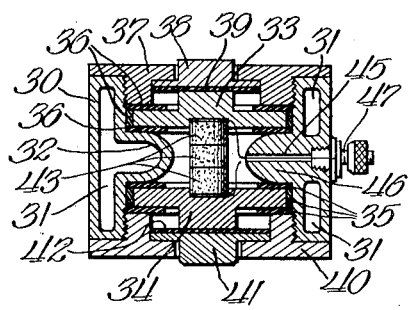

Other objects refer to and cover structural and functional details which will appear as the following description progresses. This description is rendered with reference to the accompanying drawing, wherein Fig. 1 shows one embodiment of the pressure element in section;

Fig. 2 illustrates a modification of the structure shown in Fig. 1; and

Figure 3:
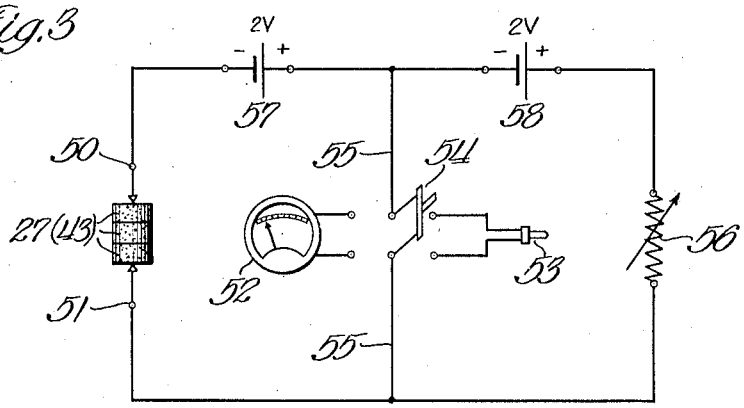
Figure 3:

Fig. 3 indicates in a diagrammatic manner the preferred circuit connections and the indicating apparatus employed in practical use of the invention.

The device is shown in both embodiments approximately to scale; however, the dimensions of details may be changed if desired or required for specific purposes. Details which may be safely presumed to be within the knowledge of those experienced in the art to which this specification is addressed have been omitted from the drawings and will be referred to in the following description only where it is necessary for rendering a clear understanding of the invention.

I will first explain the general structural and functional details as they appear from the figures; structural or functional peculiarities or properties of some of the parts will be presently pointed out.

Referring now to Fig. 1, the element shown consists of a housing of suitable shape, for example, a circular housing 11, provided with water jackets or ducts 12 for circulating water therethrough so as to keep the element at a desired temperature when cooling should be necessary. Inlets and outlets for the cooling system are not shown, but may be provided in accordance with any suitable and approved manner. Numeral 13 indicates a pressure diaphragm having a flat lower portion and a neck terminating in the threaded portion 19. It may be noted at this point that the diaphragm 13 and, in fact, any of the diaphragms used, may be in the form of a flat disk. The extension or neck is in each case merely a convenient expedient for explanatory purposes. A suitable knurled nut 20 is attached to the threaded shaft 19 for the purpose of securing a conductor so as to connect the element to the electrical circuit arrangement in which it is to function. The ring 21 is slipped over the threaded portion 19 of the neck 13 of the pressure diaphragm 22 and serves merely for properly clamping the corresponding terminal conductor in place. Another pressure diaphragm 22 is contained in the lower part of the housing 11, as shown, resting peripherally on the shoulder 23 provided within the housing. A spacer ring or insert 14 is disposed between the lower diaphragm 22 and the upper diaphragm 13, and the entire assembly is clamped in place by means of the ring 15. This closure ring may be secured in any approved manner; I have indicated that it is threaded into the housing for the sake of convenience. Numerals 16, 17 and 18 indicate insulating material disposed around the peripheral portion of the diaphragm 13 where it is clamped between the spacer ring 14 and the clamping ring 15. Thus, the pressure diaphragm 13, which also carries the means for attaching the terminal conductor, is insulated from the rest of the assembly. Disposed between the two diaphragms 13 and 22 is the carbon pressure element proper consisting, as shown, of three carbon disks designated by the numeral 27. In order to facilitate the assembly of the apparatus, the faces of the diaphragms 13 and 22 are properly recessed in the center so as to accommodate the corresponding carbon disks and to center them properly within the device. At the lower end of the device I have shown a ring nut 24 which is screwed into the lower portion of the housing 11. The central enlarged portion of this ring nut 24 may be provided with a hexagon, if desired, so as to facilitate the assembly and the attachment of the device in certain instances of practical use. This ring nut is externally threaded, as indicated, so that the entire element may be suitably secured in place; for example, in the case of investigating the pressures occurring in an internal combustion engine, the device may be secured in a suitable threaded hole in the cylinder of an engine, or placed in the threaded opening normally used for attaching a spark plug. If desired, the device may also be modified to form a combined spark plug or glow plug and pressure element. The ring nut 24 is also provided with an internal thread for accommodating a hollow nut 25 which may be formed internally hexagonal for easy manipulation. This nut presses against an auxiliary diaphragm 26 which in turn presses against the shaft of the pressure diaphragm 22. The extent to which the nut 25 is threaded into place will determine the extent of initial or normal pressure to which the carbon disks 27 are subjected.

When this element is used in practice, for example, as intimated above, for the purpose of recording the pressure of an internal combustion engine or a Diesel engine or the like, the pressure will be propagated to the carbon disks through the open end of the ring nut 24. The pressure will be directly effective to the auxiliary diaphragm 26 and from there it will be propagated to the diaphragm 22 which will be deflected thereby and will propagate the pressure to the carbon disks 27, varying the preadjusted normal resistance accordingly. The displacement of the diaphragm is in any case very small and will amount to only a few thousandths of a millimeter. The diaphragm should be made small and should follow very rapid pressure changes. The resonance of the system, including the diaphragm and the carbon disks should be high, preferably of the order of 60,000 to 80,000 cycles/sec. In general, the frequency and amplitude of the system will correspond to the external frequency and amplitude of the pressure to be measured. The upper limit of pressures to be investigated is solely determined by the strength of the material used in this unit. Speaking generally, the device may be used chiefly for measuring pressures higher than atmospheric, but if suitably modified, it will permit use for measuring pressures lower than atmospheric. If constant or slightly varying pressure differences are to be measured, it will be advisable to use a hydraulic or mechanical pressure reduction effective to the pressure element.

In Fig. 2 is shown a modification of the device just described, which comprises again two pressure diaphragms designated by the numerals 33 and 34. Whereas in the previously described structure only one diaphragm is disposed in insulated relation to the remainder of the apparatus, in this embodiment each diaphragm is separately insulated, as indicated at 35 and 36, respectively. The housing 30 is provided with a central constricted portion so as to place the water jackets or conduits 31 close to the carbon resistance element 43. A solid rib is provided extending over a part of the constricted portion to the outside wall of the housing, as indicated at 46. This rib may be provided with a duct for receiving the conductors from the opposite ends of the carbon element, and each conductor may be separately secured to a suitable terminal, such as indicated at 47. These terminals may be of a simple structure and may be disposed on the housing 30 radially adjacent each other, with access of each to the common duct or chanel 45 through which connection is made with terminal washers secured at opposite ends of the carbon element, as shown. Each of the diaphragms 33 and 34, respectively, may be again centrally recessed in order to center the carbon disks properly, and each recess may be fitted with a conductive terminal plate holding the corresponding wires leading to the terminals, such as 47.

The assembly so far described is secured in place by means of caps, such as 37 and 40, one on top and the other at the bottom of the device, each having a threaded extension for engagement with corresponding internal threads within the housing 30, as shown, and the extending portions gripping or clamping the pressure diaphragms peripherally in place against the shoulders of the constricted portion 32 of the housing. Each cap 37 and 41 is provided with a central opening for accommodating auxiliary diaphragms 38 and 41, respectively. Each of these auxiliary diaphragms approximates the shape of the main diaphragms 33 and 34, respectively, being somewhat T-shaped in cross-section and somewhat smaller than the main diaphragms, and each engages with its flat disk portion an insulating washer, such as indicated at 39 and 42. These washers in turn engage the corresponding main diaphragms 33 and 34, as shown.

Thus, if pressure is applied externally to the auxiliary diaphragms 38 and 41, it will be propagated directly to the main diaphragms 33 and 34, and since these main diaphragms are peripherally clamped in place, they will be deflected and will propagate the pressure to the carbon disks 43. The resistance of the carbon disks, briefly designated as carbon element or pressure element, will be varied in proportion to the pressure applied, regardless of whether the applied pressure is a gradually applid force or a pulsating force. It is understood, aside from the remarks made previously with regard to the properties of the disks, that the stiffness of a diaphragm will largely determine its recovery, and when rapidly changing pressures are to be investigated the diaphragms of course should be of a stiff material.

The element just described with reference to Fig. 2 may be used in a great many cases, e. g., submarine or geologic pressure investigations, or in instances where mechanical pressures are to be measured, for example, the pressures of machine systems or the like. The shanks of the auxiliary diaphragms 38 and 41, or corresponding members taking their place in case purely disk-shaped diaphragms are used, may suitably protrude from the closure caps 37 and 40, respectively, so that the element can be conveniently positioned in a place where the pressure forces are most advantageously manifest for measurement. Each diaphragm being insulated from the system as shown, the conductors leading to the electrical circuit will be directly attached to the corresponding terminals, such as 47. The normal pressure effective to the carbon disks may be adjusted by the caps 37, 40, or separate adjusting means may be provided in the form shown in Fig. 1, or in the form of adjustment screws fitted into the shanks of diaphragms 38, 41 and acting against inserts interposed between these diaphragms and the insulators 39, 42. One adjustment provision will of course suffice.

The water conduits or jackets 31 may again be suitably connected to a circulating system. They extend throughout the length of the mantle of the housing 30 and include the constricted central portion 32. The shaded portion 46 is merely a rib interrupting the radial continuity of the water jacket within the constricted portion 32, only for such an angle as is necessary for the purpose of accommodating the terminal wires in the channel or conduit 45 and for the external attachment of a pair of terminals, such as 47.

It will be noted that the embodiment shown in Fig. 2 can be made completely dust- and moisture-proof. The shanks of the auxiliary diaphragms 38 and 41 may be secured in a sliding fit relative to the central openings within the closure caps 37 and 40. Motion of the auxiliary diaphragms and also of the main diaphragms will be extremely small in any case, regardless of what kind of pressure is to be measured, and the protected condition of the device can be securely maintained. The water jackets or conduits 31 may be provided if desired, or they may be omitted if they are not necessary for any particular use of the instrument.

The pressure element of my construction may be used in an electrical arrangement such as shown in Fig. 3, consisting of a common circuit 55 and two loops extending therefrom, one loop including the pressure element proper which may be either the element 27 shown in Fig. 1 or the element 43 shown in Fig. 2. The other side of the circuit includes the variable resistor 56. Each loop or arm of this arrangement is provided with a low voltage battery, for example, a 2-volt battery, indicated at 57 and 58, respectively. Numerals 50 and 51 indicate the terminals for attaching the pressure element in the electrical arrangement. At 54 I have indicated a doublethrow switch whereby the common circuit 55 may be connected directly to a suitable instrument, for example, a milliampere meter 52, or to an oscillograph 53. A milliampere meter will be suitable wherever slowly changing pressures are to be investigated or recorded. In this case it will be advisable to calibrate the instrument in terms of pressure per square centimeter. An oscillograph, e. g., a cathode ray oscillograph or a string oscillograph, depending on the type of results to be secured by the use of my invention, will furnish better results where rapidly changing pressures are to be recorded or investigated.

The balancing or compensating resistance 56 is initially adjusted so as to balance the resistance of the carbon pressure element and the resistance of the line conductors. The adjustment is normally so that the differential current in the common circuit 55 is zero when the pressure externally applied to the pressure element is zero. This compensating resistance should be of low capacity and non-inductive.

The battery or batteries used in the two arms of the circuit arrangement should be large enough to prevent a voltage drop when the differential current is increased due to changing resistance of the pressure element. The voltage should be preferably kept constant in order to avoid variations in reading and error in the results of the measurements. In case the installation is to be made permanent, it is advisable to use a battery charger in order to keep the voltage constant.

The carbon pressure element is preferably initially calibrated for any pressure investigation that may be desired. The calibration may be accomplished in any desired way—dynamically or statically—by subjecting the element to the type and kind of pressures that may be encountered and recording these pressures in a calibration diagram. If the temperature conditions are to be considered, these should be reproduced so that they are taken into account in constructing the calibration diagram. The calibration diagram in turn can be used in order to check and to verify the findings incident to the actual pressure investigation to be carried out.

Assuming, now, that the instrument has been properly calibrated as indicated and its normal pressure properly adjusted, it may be connected in the manner shown in Fig. 3, whereupon the balance or compensating resistance 56 is adjusted so that no current flows in the common arm or common circuit 55. Any current change in the common circuit 55 will therefore be in proportion to the pressure applied to the resistance element and will be indicated or recorded properly on the instrument selectively connected to the common arm.

The calibration of the pressure element is very slightly affected by moderate overload. For heavy overloading the resistance of the carbon element will gradually approach a constant value, and wherever heavy overloading must be taken into account, corresponding data should be included in the calibration of the pressure element so as to determine its behavior. In general, the pressure element is immune to overload up to a limit of approximately 100%. If pressures are applied which are higher than the rated and calibrated pressures, the instrument will not be destroyed, but its sensitivity will be altered. The calibration chart previously prepared as described will then be useful for investigating higher pressures.

Due to the fact that the carbon element, per se, is assembled in a completely closed and protected housing, ordinary temperature fluctuations will have no effect on it. I have found that temperature differences of approximately 50° C. do not affect the reading of the apparatus. However, if the element is to be used in connection with pressure investigations in the presence of relatively high temperatures, as is the case in internal combustion engines, for example, the element can be jacketed and cooled by a stream of water circulating through the cooling conduits shown in the drawing. Where cooling cannot be supplied, calibration of the instrument at the temperature under investigation will supply the corresponding data needed for interpreting the readings.

The fields of application of my invention have been generally indicated in another place in the present specification. It may be said in conclusion that it is quite impossible to list all the fields of application of my invention in detail. The invention may be suitably applied in almost any case where pressure investigation is carried on, regardless of whether the pressure phenomena to be recorded or observed are of a natural kind or are artificially produced.

It is understood that changes and modifications in details or in the entirety of the assembly and its use are possible. I therefore want to have it distinctly understood that I do not wish to be narrowly restricted to the use of the invention exactly in accordance with the disclosure made herein, but that I intend to make use of such modifications as may be within the scope and spirit of the disclosure subject only to the prior art. What I consider my invention and desire to have protected by Letters Patent of the United States, I have specifically defined and pointed out in the appended claims.

I claim as my invention:

1. In a pressure responsive device, a cylindrical housing having an internal shoulder at one end, a ring-shaped nut threaded into the other end, a pair of resilient metallic disks with a resistance element between them clamped between said shoulder and said nut, said element being adapted to change its resistance responsive to changes in pressure, means for communicating pressure to a portion of the disk adjacent said shoulder, whereby pressure is communicated to said element, means insulating the other disk from the housing, and a terminal member extending from said insulated disk through the opening in said nut to a point outside the housing.

2. In a pressure responsive device, a cylindrical housing, two spaced resilient disks located in said housing, means for rigidly clamping said disks at the periphery thereof in fixed relation to said housing, a pressure responsive variable resistance element comprising a plurality of solid carbon blocks compressed between the central portions of said disks, said blocks being of such diameter that each disk has an annular yielding portion between the annular portion engaged by said clamping means and the adjacent carbon block, means for communicating pressure from outside the housing to one of said disks to vary the degree of compression of said blocks, and means for including said blocks in an electrical circuit.

ALBERT W. KRAUSE.